(12) United States Patent
Fertig et al.

(10) Patent No.: US 8,055,809 B2
(45) Date of Patent: Nov. 8, 2011

(54) SYSTEM AND METHOD FOR DISTRIBUTING SIGNAL WITH EFFICIENCY OVER MICROPROCESSOR

(75) Inventors: Matthias Fertig, Altdorf (DE); Tilman Gloekler, Gaertringen (DE); Ralph C. Koester, Tuebingen (DE); Alexander Erik Mericas, Austin, TX (US); Thomas Pflueger, Leinfelden (DE); Daniel Becker, Meckenheim (DE)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/343,594

(22) Filed: Dec. 24, 2008

(65) Prior Publication Data
US 2010/0161867 A1 Jun. 24, 2010

(51) Int. Cl.
*G06F 3/00* (2006.01)
(52) U.S. Cl. .......................................... 710/15; 710/100
(58) Field of Classification Search .................. 710/100, 710/15
See application file for complete search history.

(56) References Cited

U.S. PATENT DOCUMENTS

| | | | |
|---|---|---|---|
| 6,895,189 B1* | 5/2005 | Bedrosian | 398/155 |
| 2004/0006724 A1* | 1/2004 | Lakshmanamurthy et al. | 714/25 |
| 2005/0273661 A1* | 12/2005 | Brajovic | 714/30 |
| 2007/0294054 A1* | 12/2007 | Mericas | 702/186 |
| 2008/0040634 A1* | 2/2008 | Matsuzaki et al. | 714/47 |
| 2010/0115191 A1* | 5/2010 | Hampel et al. | 711/103 |

* cited by examiner

*Primary Examiner* — Khanh Dang
*Assistant Examiner* — Nimesh G Patel
(74) *Attorney, Agent, or Firm* — Schmeiser, Olsen & Watts; Cynthia Seal

(57) ABSTRACT

A system and associated method for distributing signals with efficiency over a microprocessor. A performance monitoring unit (PMU) sends configuration signals to a unit to monitor an event occurring on the unit. The unit is attached to a configuration bus and an event bus that are daisy-chained from PMU to other units in the microprocessor. The configuration bus transmits configuration signals from the PMU to the unit to set the unit to report the event. The unit sends event signals to the PMU through the event bus. The unit is configured upon receiving configuration signals comprising a base address of a bus ramp of the unit. A number of units and a number of events for monitoring is flexibly selected by adjusting a length of bit fields within configuration signals.

7 Claims, 7 Drawing Sheets

SYSTEM AND METHOD FOR DISTRIBUTING SIGNAL WITH EFFICIENCY OVER MICROPROCESSOR

This invention was made with Government support under Contract No.: HR0011-07-9-0002 awarded by DARPA. The Government has certain rights in this invention.

FIELD OF THE INVENTION

The present invention discloses a system and associated method for improved performance monitoring within a microprocessor.

BACKGROUND OF THE INVENTION

Conventional performance measurement methods within a microprocessor require events describing how the microprocessor performs and a monitoring unit that correlates the events, to assess performance and to detect a bottleneck of performance in the microprocessor and/or in a system utilizing the microprocessor. The monitoring unit distributes multiple signals to monitored units of the microprocessor to collect the events describing interactions among the monitored units in the microprocessor. Conventional performance measurement methods utilize a bus dedicated to distribute and to collect each signal from the monitoring unit. In conventional performance measurement methods, the bus carries more events than the monitoring unit needs due to multiplexing of events onto the bus. Due to the number of signals for monitoring purposes and inefficient use of the bus, conventional performance measurement methods have a significant wiring and routing overheads within the microprocessor.

Thus, there is a need for an apparatus that overcomes at least one of the preceding disadvantages of current apparatuses of monitoring performance within a microprocessor.

SUMMARY OF THE INVENTION

The present invention provides an apparatus for distributing at least one signal over a microprocessor, the apparatus comprising:

a performance monitoring unit (PMU) of the microprocessor, the PMU controlled by content of a monitor control register of the microprocessor;

at least one unit monitored by the PMU;

a configuration bus coupling the PMU to said at least one unit in a first daisy chain such that the PMU sends configuration signals to said at least one unit via the configuration bus; and an event bus coupling said at least one unit to the PMU in a second daisy chain such that the PMU receives event signals from said at least one unit via the event bus.

The present invention provides a method and system that overcomes at least one of the current disadvantages of conventional apparatus for distributing signals within a microprocessor.

DETAILED DESCRIPTION OF THE INVENTION

Figure 1:
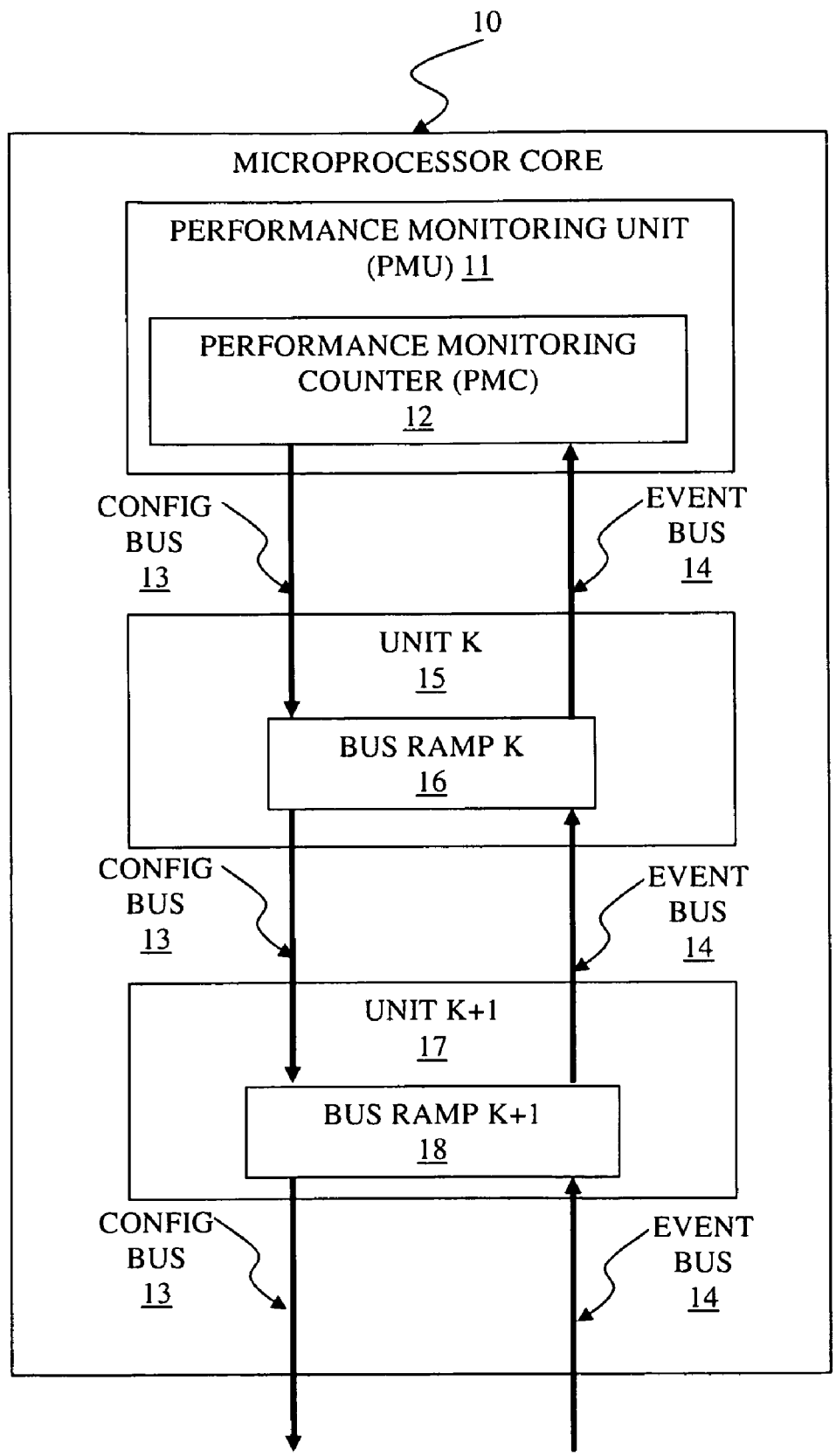
FIG. 1 illustrates a microprocessor core system for distributing signal with efficiency over a microprocessor, in accordance with embodiments of the present invention.

FIG. 1 illustrates a microprocessor core system 10 for distributing signal with efficiency over a microprocessor, in accordance with embodiments of the present invention.

The microprocessor core system 10 comprises a performance monitoring unit (PMU) 11, a configuration bus 13, an event bus 14, and at least one unit in the microprocessor core system 10 that is monitored by the PMU 11.

The PMU 11 monitors performance of said at least one unit by configuring events that the PMU 11 needs to collect and by collecting event signals from said at least one units. An event is an indicator for a certain situation inside a monitored unit worth monitoring to elaborate workload, congestion, or any other performance metric, etc. The PMU 11 comprises at least one performance monitor counter (PMC) 12 that is set to count a respective events to be monitored. The PMU 11 communicates with said at least one units through the configuration bus 13 and the event bus 14, which are dedicated for performance monitoring.

The configuration bus 13 transmits signals that configure said at least one unit from the PMU 11 to a unit of said at least one unit. A width of the configuration bus 13, i.e., a number of bits that are simultaneously transmitted through the configuration bus 13, is determined at designing the microprocessor core 10 based on the number of units and events to be monitored. The event bus 14 transmits signals on events that are reported by said at least one unit to the PMU 11. A width of the event bus 14 is determined based on the amount of data in an event to be monitored A unit K 15 of said at least one unit comprises a bus ramp K 16. The bus ramp K 16 is identified by a base address of the bus ramp K 16. The base address of the bus ramp K 16 is a unique binary value that is assigned to the bus ramp K 16 at instantiation time. The bus ramp K is configured by signals transmitted through the configuration bus 13 from the PMU 11 pursuant to a monitoring scenario that defines events required to be monitored by the PMU 11. The bus ramp K 16 sends signals reporting events on the unit K 15 through the event bus 14 to the PMU 11.

A unit (K+1) 17 of said at least one unit comprises a bus ramp (K+1) 18. The unit (K+1) 17 and the bus ramp (K+1) 18 have features that are analogous to aforementioned features of the unit K 15 and the bus ramp K 16, respectively. The unit (K+1) 17 communicates with the PMU 11 through the unit K 15. See the description of FIG. 2, infra, for bus topology of the configuration bus 13 and the event bus 14.

An example implementing a conventional performance measurement method is, inter alia, a Performance Monitoring Unit (PMU) of IBM® POWER6™ microprocessor. (IBM is a registered trademark of the International Business Machines, Inc., in the United States and/or other countries; POWER6 is a trademark of the International Business Machines, Inc., in the United States and/or other countries.)

In one embodiment of the present invention, a performance monitoring counter (PMC) 12 is set to count either one event monitored by a pair of event signals, a sum of both events, or cycles in which both events are active. This embodiment is referred to as a P7 microprocessor throughout this specification. The P7 microprocessor utilizes a PMC-centric approach. In this embodiment, the event bus 14 carries only the pair of event signals for the PMC, which is selected by multiplexing all available events on the side of a monitored unit. See descriptions of FIG. 7, infra, illustrating how events are handled per a monitoring scenario for an example. By selecting the amount of event signals to be transmitted to the PMU 11 on the side of the monitored unit, this embodiment significantly reduces unnecessary signal traffic on the event bus 14 that is discarded by the PMU. Consequently, this embodiment mitigates wiring overheads associated with a Simultaneous Multi-Threading (SMT) SMT4 design.

Figure 2:
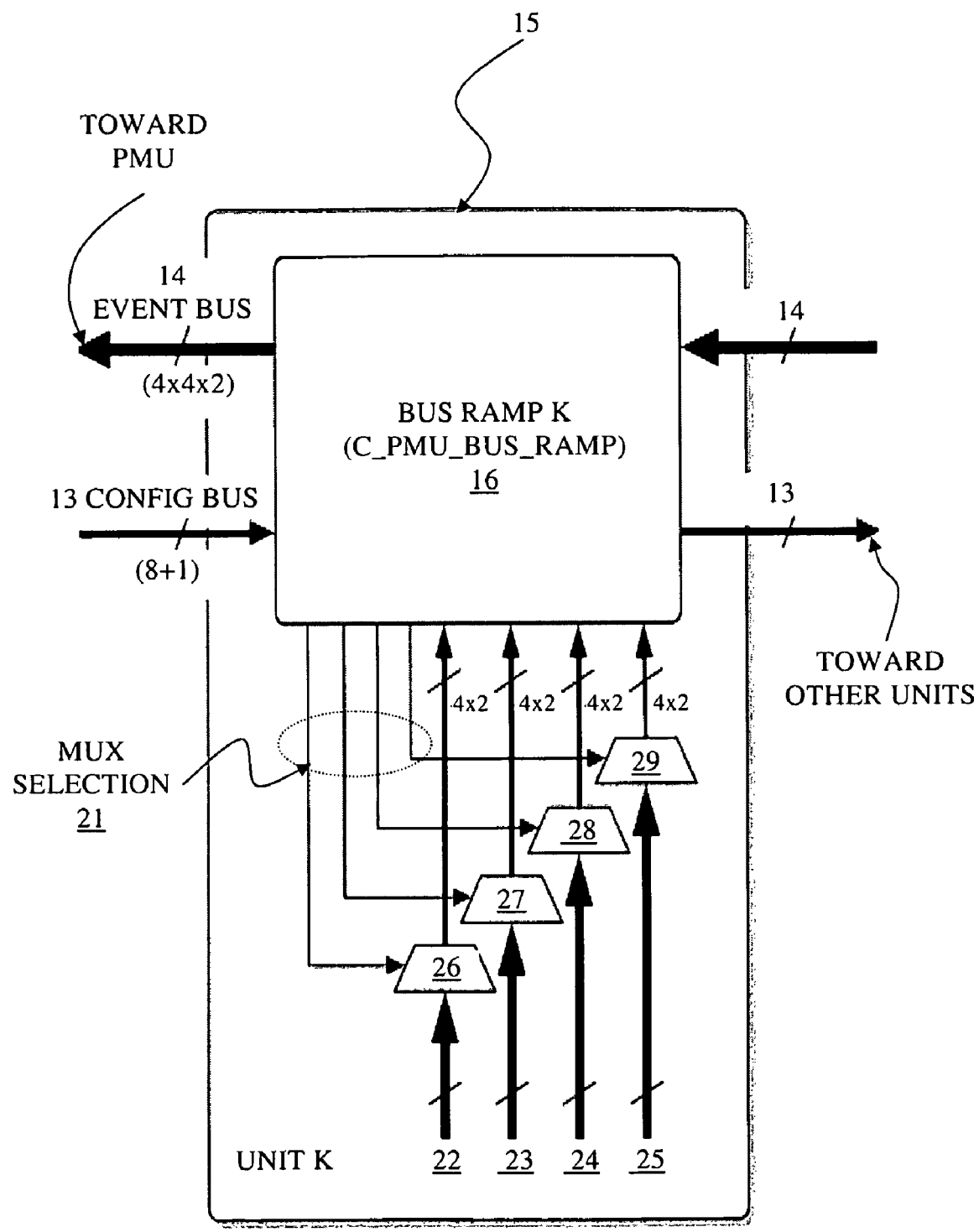
FIG. 2 illustrates an exemplary configuration scheme of a bus ramp within a unit for distributing signal with efficiency over a microprocessor, in accordance with the embodiments of the present invention.

FIG. 2 illustrates an exemplary configuration scheme of a bus ramp within a unit for distributing signal with efficiency over a microprocessor, in accordance with the embodiments of the present invention.

The unit K 15 is connected with a 32-bit event bus to other units toward the PMU, and connected with an 8-bit configuration bus to same other units downward from the PMU, via the bus ramp K 16 in both directions.

The bus ramp K 16 is instantiated as 'C_PMU_BUS_RAMP' within the unit K 15. The 'C_PMU_BUS_RAMP' instance 16 is attached to the event bus 14 and the configuration bus 13, which are external to the unit K 15. The 'C_PMU_BUS_RAMP' instance 16 is attached to an internal event scheme comprising an internal bus, internal multiplexers and thread event input buses.

A mux selection signal 21 is an output from the bus ramp K 16 that selects configured events by selecting a multiplexer that carries signals from the configured events. The mux selection signal 21 is sent by the PMU within a configuration signal over the configuration bus 13.

The internal multiplexers comprising a MUX_0 26, a MUX_1 27, a MUX_2 28, and a MUX_3 29, are employed within the unit K 15 to carry signals from associated events from the thread input buses comprising a THREAD_0_EVENTS 22, a THREAD_1_EVENTS 23, a THREAD_2_EVENTS 24, and a THREAD_3_EVENTS 25, respectively.

Each thread input bus is dedicated to a specific thread among multiple threads that exist within the microprocessor such as a Simultaneous Multi-Threading (SMT) processor. Pursuant to a scenario for more flexible performance monitoring, event signals from a specific thread may be separately tracked at a bus ramp at a unit and monitored by a dedicated PMC. Bus ramps in units along the event bus can be configured to count events for the specific thread.

Figure 3:
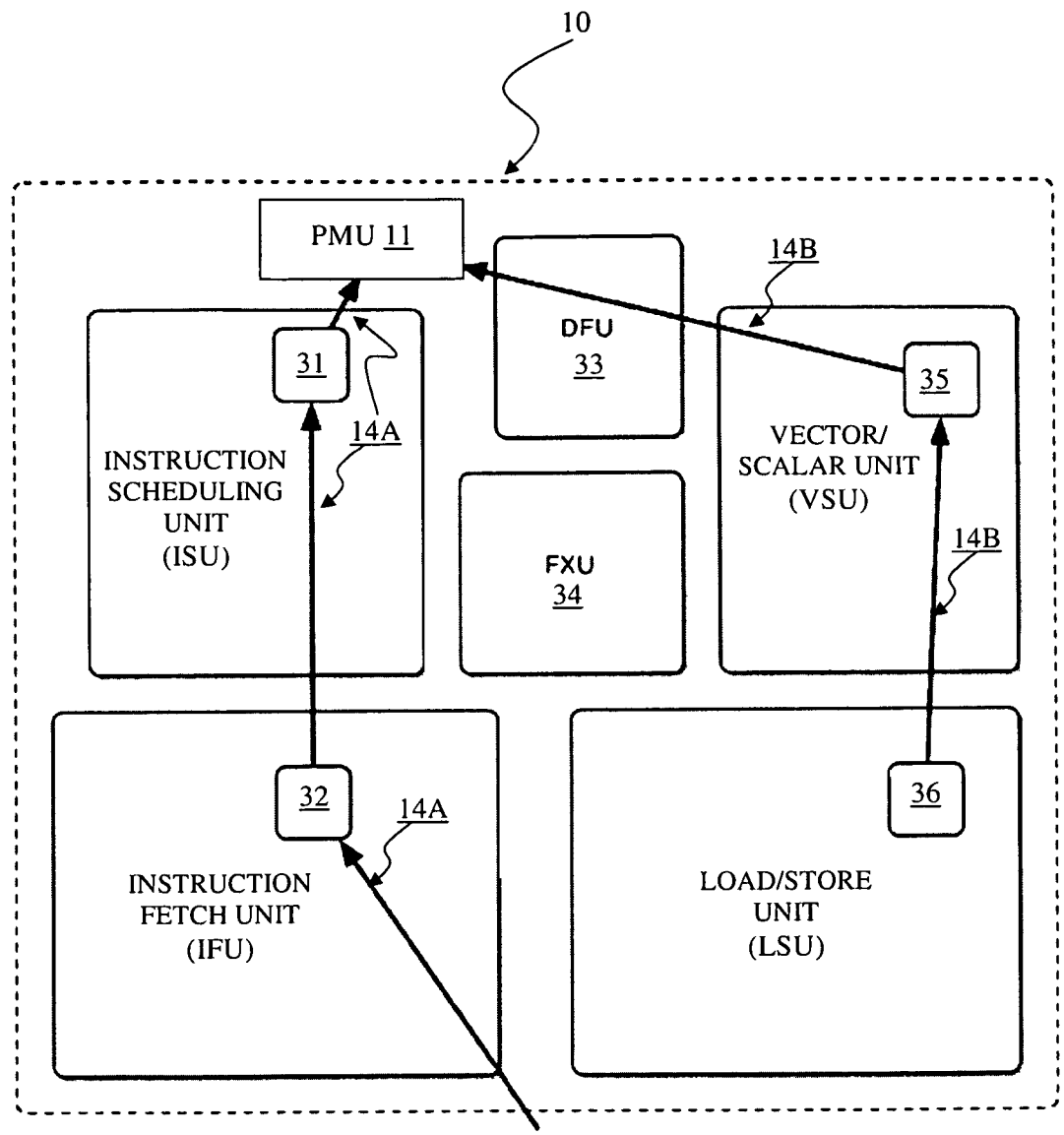
FIG. 3 illustrates an example event bus topology for distributing signal with efficiency over a microprocessor, in accordance with the embodiments of the present invention.

FIG. 3 illustrates an example event bus topology for distributing signal with efficiency over a microprocessor, in accordance with the embodiments of the present invention.

The example is employed for the event bus 14 to connect four units in the microprocessor core 10 to the PMU 11 for reporting events occurring at the units. The configuration bus 13 may employ the same topology to configure the units by sending signals in reverse direction from the PMU 11 to the units.

A first branch of the event bus 14A connects an external unit outside of the microprocessor core 10, an Instruction Fetch Unit (IFU) bus ramp 32, an Instruction Scheduling Unit (ISU) bus ramp 31, and the PMU 11. A second branch of the event bus 14B connects a Load/Store Unit (LSU) bus ramp 36, a Vector Scalar Unit (VSU) bus ramp 35, and the PMU 11. Both branches are daisy-chained, i.e., connected from one unit to next unit. A Decimal Floating Point Unit (DFU) 33 and a Fixed Point Unit (FXU) 34 are not connected to the PMU 11 because the DFU 33 and the FXU 34 are not selected for performance monitoring in the example. See description of FIGS. 4, 5, and 6, infra, for details on a configuration of the selected unit by the PMU 11. Each unit is hardwired to the event bus 14. The units are interconnected over the event bus 14 by instantiating a respective bus ramp in each unit.

A daisy-chain illustrated in the example is a proper bus topology for performance monitoring because units to be monitored do not send an event signal at every cycle such that multiple units can share the bus without conflicts. The method of the present invention minimize the amount of wiring resources consumed by the event bus by using the daisy-chain in which all units are chained from a source unit to the PMU, or from the PMU to a sink unit in case of a configuration bus. Each unit receives incoming event signals from an immediately foregoing unit that is connected to the event bus. Each unit may multiplexes event signals originating from said each unit and produces a multiplexed event signal, and then forwards the multiplexed event signal to an immediately following unit. Wherein a source node and a target node are coupled via an intermediate node in a daisy-chain, the intermediate node can be bypassed using a clock gating technique.

Figure 4:
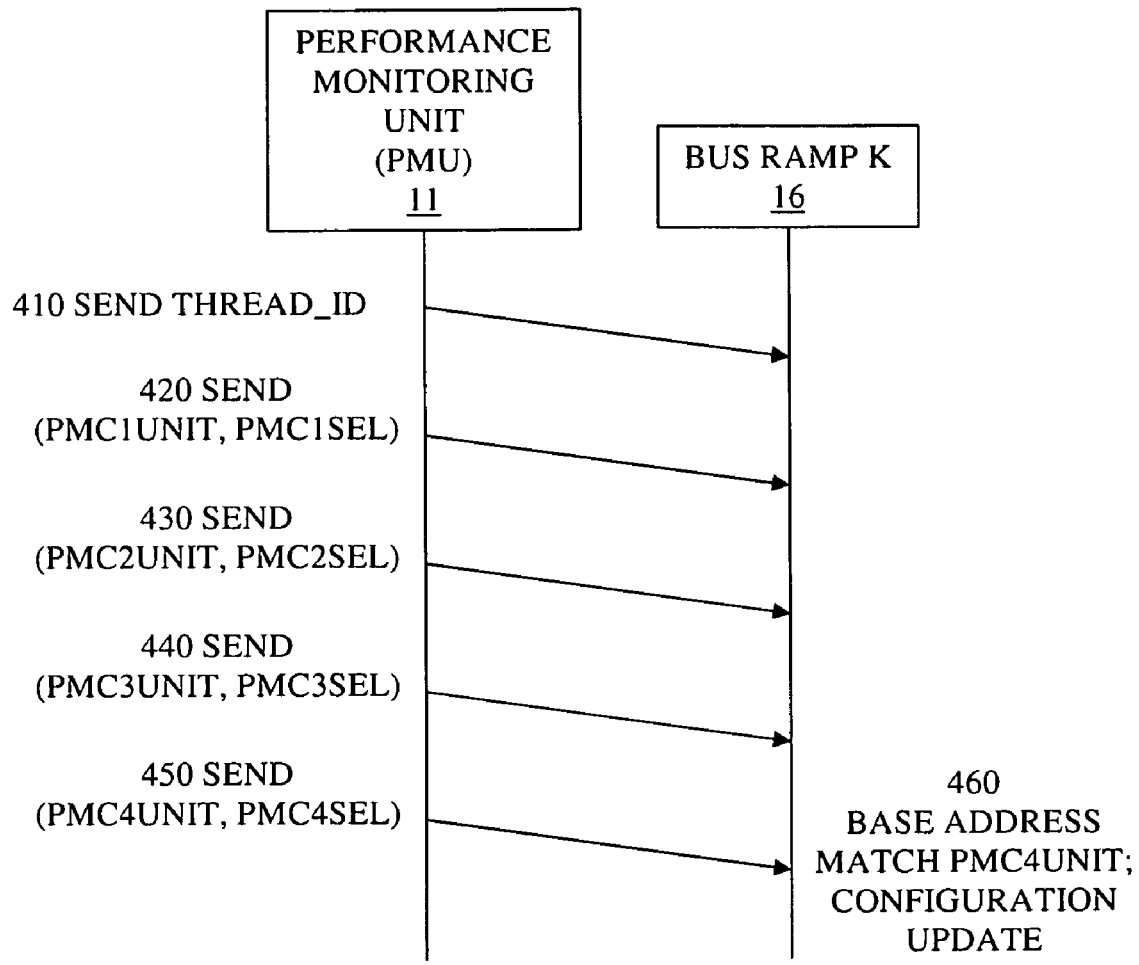
FIG. 4 illustrates a protocol used for distributing signal with efficiency between the performance monitoring unit (PMU) and units in a microprocessor, in accordance with the embodiments of the present invention.

FIG. 4 illustrates a protocol used for distributing signal with efficiency between the performance monitoring unit (PMU) and units in a microprocessor, in accordance with the embodiments of the present invention.

The protocol comprises two phases. In a first phase, the PMU configures the units in the microprocessor pursuant to a configuration setting of a performance monitoring scenario. In a second phase, the PMU monitors the units that reports events pursuant to the configuration setting.

The configuration setting is defined by a tuple (thread, unit, event) that specifies which thread will be monitored on what unit for which event. The events to be monitored and a respective encoding of the events for a respective unit, i.e., a mapping between unit and event for all events, are hardwired design features within the microprocessor. A signal to select a specific unit and a respective base address of the respective unit are also a hardwired design feature of the microprocessor. Any hardwired design feature is configurable by the PMU for the purpose of performance monitoring.

In another embodiment, the respective base address of units can be configured by using latches or other programmable facilities within the microprocessor in assigning the respective base address.

For monitoring an event within the PMU, a performance monitoring counter (PMC) is associated with each event for performance measurement. The PMU sends the configuration setting within (i+1) configuration data beats that is defined in a monitoring scenario, wherein (i) is the number of performance monitoring counters (PMCs) to be configured. Each beat contains a predefined amount of data that is synchronized with an internal state machine of a PMU bus ramp. A user defines related bits in control registers that store the configuration.

A data for a configuration setting is assigned to a configuration register referred to as a Monitor Control register. The PMU sends the configuration setting in the Monitor Control register to a unit associated with events to be monitored. The configuration setting is specific to a thread to be monitored by the PMU.

To configure (n) number of events in respective units to be monitored for a specific thread, the PMU sends (n+1) number of configuration data beats that selects the specific thread and subsequently configures (n) number of events in respective units. A beat is a cycle sending a set of data from a source to a destination over an interface, wherein the source is the PMU, the destination is a bus ramp in a unit, and the interface is the configuration bus. Within the PMU, (n) number of performance monitoring counters (PMCs) exist for each event to be monitored such that the PMU store a respective result of each event reported by a respective unit associated with each event. Consequently, (t*(n+1)) number of configuration data beats are required to configure (t) number of threads for (n) number of events to be monitored.

In a first configuration data beat 410, the PMU sends a THREAD_ID signal that identifies which thread is configured with subsequent beats sent by the PMU.

In a second configuration data beat 420, the PMU sends a (PMC1UNIT, PMC1SEL) signal to monitor the THREAD_ID thread with a first performance monitoring counter (PMC1) to store a result. A PMC1UNIT data field of the (PMC1UNIT, PMC1SEL) signal selects a unit to be monitored for the THREAD_ID thread. A PMC1SEL data field of the (PMC1UNIT, PMC1SEL) signal selects at least one event to be monitored for the THREAD_ID thread.

In a third configuration data beat 430, the PMU sends a (PMC2UNIT, PMC2SEL) signal to monitor the THREAD_ID thread with a second performance monitoring counter (PMC2) to store a result. A PMC2UNIT data field of the (PMC2UNIT, PMC2SEL) signal selects a unit to be monitored for the THREAD_ID thread. A PMC2SEL data field of the (PMC2UNIT, PMC2SEL) signal selects at least one event to be monitored for the THREAD_ID thread.

In a fourth configuration data beat 440, the PMU sends a (PMC3UNIT, PMC3SEL) signal to monitor the THREAD_ID thread with a third performance monitoring counter (PMC3) to store a result. A PMC3UNIT data field of the (PMC3UNIT, PMC3SEL) signal selects a unit to be monitored for the THREAD_ID thread. A PMC3SEL data field of the (PMC3UNIT, PMC3SEL) signal selects at least one event to be monitored for the THREAD_ID thread.

In a fifth configuration data beat 450, the PMU sends a (PMC4UNIT, PMC4SEL) signal to monitor the THREAD_ID thread with a fourth performance monitoring counter (PMC4) to store a result. A PMC4UNIT data field of the (PMC4UNIT, PMC4SEL) signal selects a unit to be monitored for the THREAD_ID thread. A PMC4SEL data field of the (PMC4UNIT, PMC4SEL) signal selects at least one event to be monitored for the THREAD_ID thread.

Generically, in a (k+1) configuration data beat subsequent to the first configuration data beat identifying a specific thread to be monitored, the PMU sends a (PMCkUNIT, PMCkSEL) signal to monitor the specific thread on a unit selected by a PMCkUNIT data field for events selected by a PMCkSEL data field employing a PMCk counter.

The PMCkUNIT data field is compared against a base address of a bus ramp of each unit. If the base address of the bus ramp on the unit matches the PMCkUNIT data field, the unit is configured by the (PMCkUNIT, PMCkSEL) signal. If the base address of the bus ramp on the unit does not match the PMCkUNIT data field, the unit is not affected by the (PMCkUNIT, PMCkSEL) signal. A number of bits used for the PMCkUNIT data field within the (PMCkUNIT, PMCkSEL) signal may vary based on, inter alia, a number of sub-units within a unit to be separately monitored, a number of events to be monitored within a unit, etc.

The PMCkSEL data field controls multiplexers in the unit selected by the PMCkUNIT data field and in the PMU to route incoming event signals from the selected unit to the (k)-th performance monitoring counter (PMCk). A number of bits used for the PMCkSEL data field within the (PMCkUNIT, PMCkSEL) signal may vary depending on the number of bits used for the PMCkUNIT data field because the (PMCkUNIT, PMCkSEL) signal has a fixed number of bits.

In another embodiment of the present invention, a (PMCx-UNIT, PMCySEL) signal is employed to configure (x) number of units and (y) number of events for each thread to be monitored.

Figure 5A:
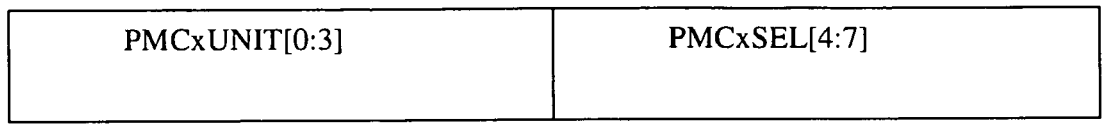
FIGS. 5A, 5B, and 5C illustrate an example of varying widths of a PMCkUNIT data field and a PMCkSEL data field within a (PMCkUNIT, PMCkSEL) signal, in accordance with the embodiments of the present invention.
Figure 5B:
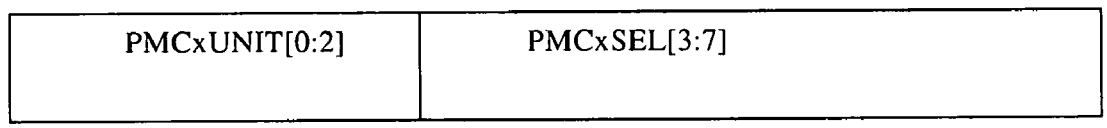
Figure 5C:
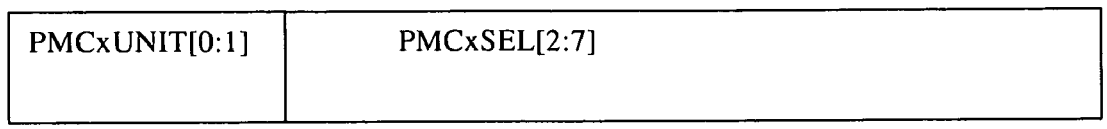

FIGS. 5A, 5B, and 5C illustrate an example of varying widths of a PMCkUNIT data field and a PMCkSEL data field within a (PMCkUNIT, PMCkSEL) signal, in accordance with the embodiments of the present invention.

The (PMCkUNIT, PMCkSEL) signal is an 8-bit signal, and a PMCkUNIT data field uses first 4-bit and a PMCkSEL data field uses next 4-bits in an initial configuration signal. A Load/Store Unit (LSU) has two subunits of an LSU0 and an LSU1. Provided that the LSU has multiple execution pipes [meaning threads?] and that a total number of units to be monitored by the PMU permits assigning two addressed to the LSU, a respective bit width of each data field may be modified to assign a portion of bits in the PMCkUNIT data field to the PMCkSEL data field.

If it is desired to monitor 32 events respective to the LSU0 and the LSU1 separately, the PMCkUNIT data field can be reduced by one bit to increase the number of bits in the PMCkSEL data field such that the PMCkSEL data field has enough bits to identify 32 events, i.e., 5 bits. Provided that the PMU monitors a total number of 8 units, the PMCkUNIT data field may use 3 bits to select all units to be monitored. Because only one bit is necessary to distinguish the LSU0 and the LSU1, the PMCkUNIT data field can be reduced down to a single bit if the PMU monitors only the LSU. An internal logic in a bus ramp of the LSU is modified to signal address match according to the changed bit width of the respective data field in the (PMCkUNIT, PMCkSEL) signal. When the PMCkSEL data field is increased by n bit(s) in exchange of reducing the PMCkUNIT data field by n bit(s), a number of events that can be counted by the PMCkSEL data field is increased in multiples of $2^n$, wherein n is a positive integer less than a width of the configuration bus.

In another embodiment of the present invention, bits freed from the PCMkUNIT field can be used as a signal to select a multiplexer as illustrated in FIG. 2, supra.

Figure 6:
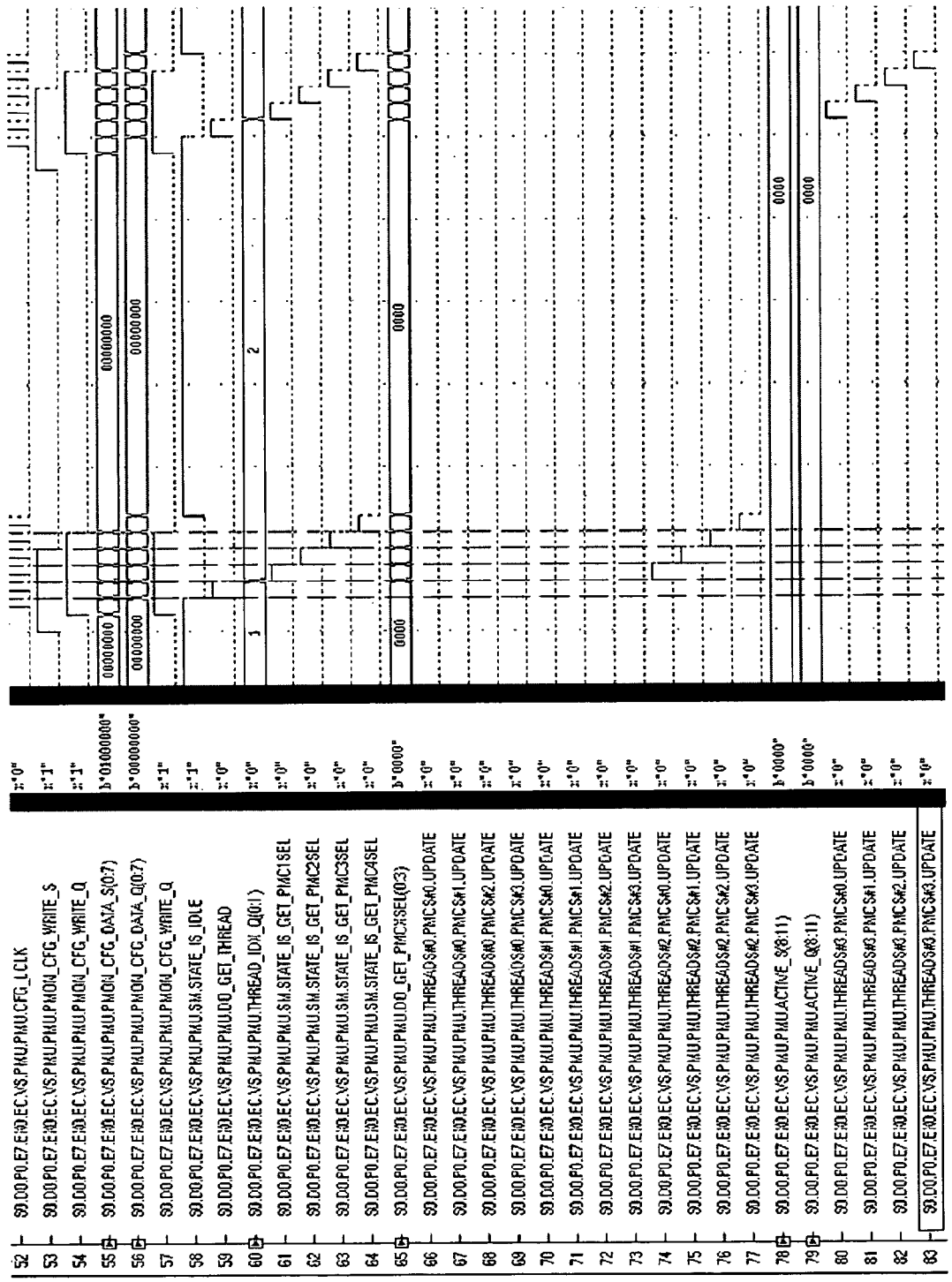
FIG. 6 illustrates a sequence of configuration signals to monitor a thread on a vector/scalar unit (VSU), in accordance with the embodiments of the present invention.

FIG. 6 illustrates a sequence of configuration signals to monitor a thread on a vector/scalar unit (VSU), in accordance with the embodiments of the present invention.

There are four performance monitoring counters (PMCs) in the PMU. Signals on the configuration bus that is not addressed to the VSU are bypassed and the VSU do not analyzed such signals via clock gating technique.

A DO_GET_THREAD signal 59 identifies which thread will be monitored.

the subsequent cycles are used to receive the units and selects configuration.

A STATE_IS_GET_PMCkSEL signal 61, 62, 63, and 64, indicates a respective configuration data for each PMCk, wherein k=1, 2, 3, and 4, respectively.

A THREADS#0.PMC#j.UPDATE signal, 66, 67, 68, and 69, indicate the configuration updates for PMC0, counting events for Thread 0.

Figure 7:
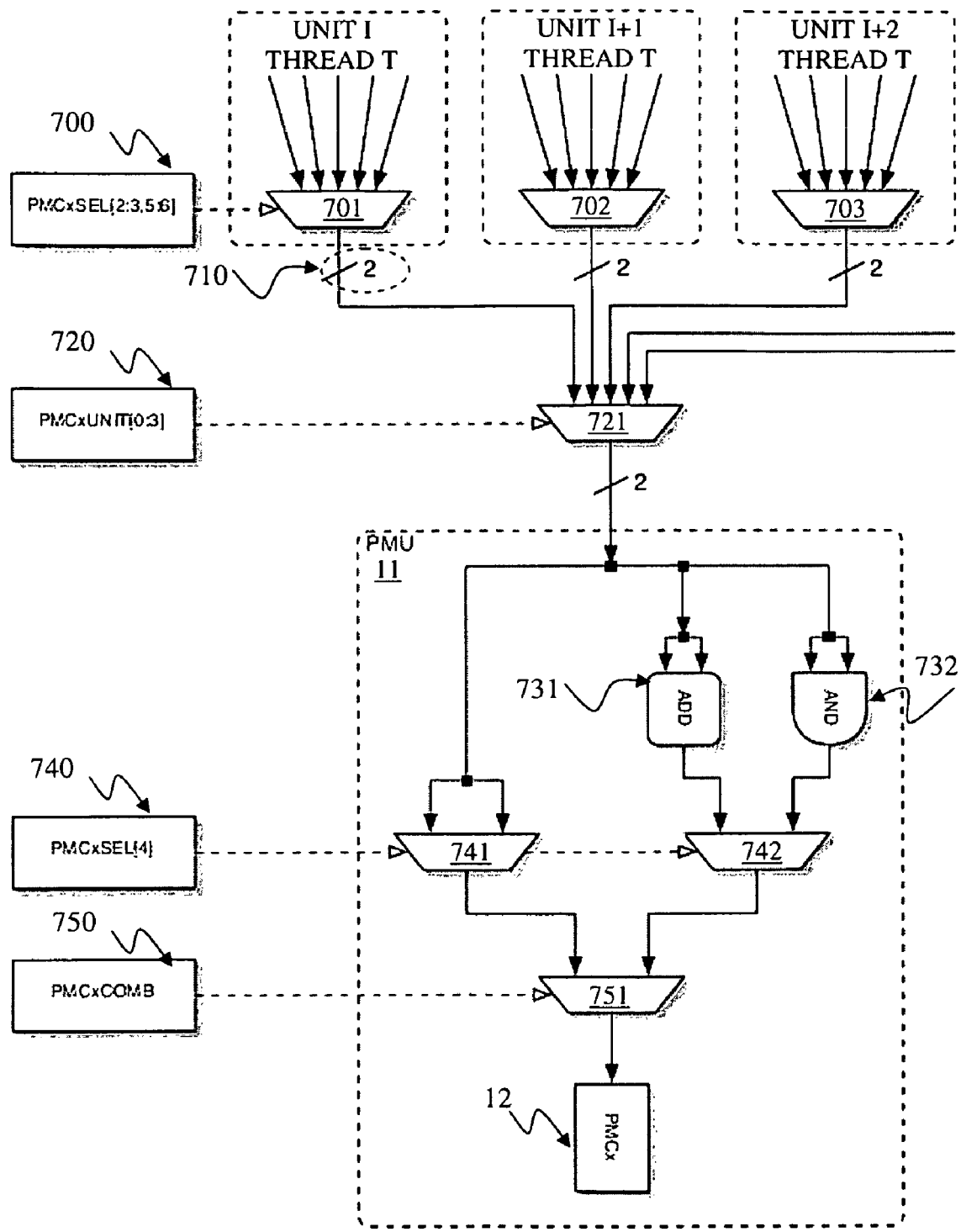
FIG. 7 illustrates how the performance monitoring unit (PMU) handles events, in accordance with the embodiments of the present invention.

FIG. 7 illustrates how the performance monitoring unit (PMU) handles events, in accordance with the embodiments of the present invention.

Three units UNIT I, UNIT (I+1), and UNIT (I+2) monitor events of a thread THREAD T, and send event data to an internal multiplexer in each unit, 701, 702, and 703, respectively. A configuration signal (PMCxUNIT, PMCxSEL) is used to configure monitoring.

A PMCxSEL[2:3,5:6] field 700 of the configuration signal is used to select which multiplexer of three internal multiplexers, 701, 702, and 703, is selected to send event data. An event bus 710 shows that events are simultaneously sent to the PMU 11 in an event-pair, i.e., two events.

A PMCxUNIT[0:3] field 720 of the configuration signal is used to select an event data using an interim multiplexer 721 that will proceed to the PMU 11.

Within the PMU 11, an ADD gate 731 and an AND gate 732 enables the PMU 11 to manipulate event data in the event-pair for flexible monitoring.

The PMCxSEL[4] field 740 of the configuration signal is used to select event data at either a first PMU-internal multiplexer 741 or a second PMU-internal multiplexer 742.

A PMCxCOMB 750 indicates a combined signal of the PMCxUNIT and the PMCxSEL, wherein each field have a respective variable length.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An apparatus for distributing at least one signal over a microprocessor, the apparatus comprising:

a performance monitoring unit (PMU) of the microprocessor, the PMU controlled by content of a monitor control register of the microprocessor;

at least one unit of the microprocessor monitored by the PMU, wherein each unit of said at least one unit comprises a respective bus ramp associated with a respective base address that identifies said each unit, wherein said at least one unit is selected from a group consisting of an instruction scheduling unit (ISU), an instruction fetch unit (IFU), a vector/scalar unit (VSU), a load/store unit (LSU), and combinations thereof;

a configuration bus coupling the PMU to said at least one unit in a first daisy chain passing a sequence of configuration signals unidirectionally from the PMU toward said at least one unit via a respective bus ramp of said at least one unit such that the PMU sends the sequence of configuration signals comprising a first base address to said at least one unit via the configuration bus in selectively controlling a destination unit of said at least one unit that has a first base ramp identified by the first base address; and an event bus coupling said at least one unit to the PMU in a second daisy chain passing a sequence of event signals unidirectionally from said at least one unit toward the PMU via the respective bus ramp of said at least one unit such that the PMU receives the sequence of event signals from said at least one unit via the event bus, wherein the PMU uniquely identifies a source unit of said at least one unit that had sent the received event signals by examining a second base address associated with a second base ramp of the source unit.

2. The apparatus of claim 1, wherein the configuration bus in the first daisy chain unidirectionally connects the PMU to a first unit of said at least one unit, and the configuration bus unidirectionally connects a n-th unit of said at least one unit to a (n+1)-th unit of said at least one unit for n=1 to (u−1), wherein the event bus in the second daisy chain unidirectionally connects the first unit of said at least one unit to the PMU, and the event bus unidirectionally connects the (n+1)-th unit to the n-th unit for n=1 to (u−1), wherein n is a positive integer and wherein u is a number of said at least one unit attached through the configuration bus and the event bus.

3. The apparatus of claim 1, wherein the content of the monitor control register is a configuration setting (thread_id, unit_addr, event_id) that configures a unit of said at least unit for monitoring an event occurring within the unit while executing a thread, wherein a first configuration signal of said configuration signals comprises thread_id data that identifies the thread, a second configuration signal comprising unit_addr data that identifies the unit and event_id data that identifies the event.

4. The apparatus of claim 3, wherein the respective bus ramp configures the unit for monitoring the event identified by the event_id data while executing the thread identified by the thread_id data upon determining that the unit_addr data of the second configuration signal matches the respective base address of the respective bus ramp.

5. The apparatus of claim 4, wherein a number of bits in the configuration signals is determined as (i) that is a bit width of the configuration bus, wherein (j) is a number of bits in the unit_addr data, wherein (k) is a number of bits in the event_id data, wherein the number of bits in the second configuration signal is equal to a sum of the number of bits in the unit_addr data and the number of bits in the event_id data, wherein (i)=(j+k), wherein the bits in the second configuration signal configures monitoring for $2^{(k)}$ number of events occurring in $2^{(j)}$ number of units, wherein (j) and (k) are determined upon instantiating the respective bus ramp, and wherein j, and k are positive integer.

6. The apparatus of claim 3, wherein the respective bus ramp bypasses the configuration signals to a next unit along the configuration bus upon determining that the unit_addr data of the second configuration signal does not match the respective base address of the respective bus ramp.

7. The apparatus of claim 1, wherein the configuration bus is 8-bit in width, wherein the event bus is 32-bit in width, wherein a unit of said at least one unit is configured to monitor events from four (4) threads, wherein a respective 8-bit input is selected from inputs of each thread by a respective multiplexer associated with each thread, wherein a thread out of the four threads is selected by a select bit that is output by a bus ramp of the unit from configuration signals.

* * * * *